United States Patent
Saida

(10) Patent No.: US 9,001,303 B2
(45) Date of Patent: Apr. 7, 2015

(54) DISPLAY PANEL AND METHOD FOR FABRICATING SAME

(75) Inventor: Shinsuke Saida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 65 days.

(21) Appl. No.: 13/990,120

(22) PCT Filed: Nov. 22, 2011

(86) PCT No.: PCT/JP2011/006515
§ 371 (c)(1),
(2), (4) Date: May 29, 2013

(87) PCT Pub. No.: WO2012/073456
PCT Pub. Date: Jun. 7, 2012

(65) Prior Publication Data
US 2013/0242242 A1  Sep. 19, 2013

(30) Foreign Application Priority Data
Nov. 30, 2010  (JP) ................................ 2010-267231

(51) Int. Cl.
*G02F 1/1333* (2006.01)
*G02F 1/1335* (2006.01)
*G02F 1/1345* (2006.01)

(52) U.S. Cl.
CPC .... *G02F 1/133553* (2013.01); *G02F 1/133305* (2013.01); *G02F 1/1345* (2013.01); *G02F 2201/50* (2013.01); *G02F 2203/02* (2013.01); *G02F 1/133351* (2013.01)

(58) Field of Classification Search
CPC ................................................. G02F 1/133351
USPC .................. 349/187, 158, 110–111, 149–153
See application file for complete search history.

(56) References Cited

U.S. PATENT DOCUMENTS

| 7,948,600 | B2 * | 5/2011 | Okamoto et al. | ............. 349/187 |
| 2009/0103010 | A1 * | 4/2009 | Okamoto et al. | ............. 349/73 |

FOREIGN PATENT DOCUMENTS

| JP | 2009-98425 A | 5/2009 |
| JP | 2011-178636 A | 9/2011 |
| WO | 2010/097855 A1 | 9/2010 |

OTHER PUBLICATIONS

Official Communication issued in International Patent Application No. PCT/JP2011/006515, mailed on Feb. 21, 2012.

* cited by examiner

*Primary Examiner* — James Dudek
(74) *Attorney, Agent, or Firm* — Keating & Bennett, LLP

(57) ABSTRACT

A liquid crystal display panel (1) includes: a flexible first plastic substrate (11); a TFT substrate (10) having a terminal region (T) on the first plastic substrate (11) where a terminal (27) and a wire electrode (28) are formed; a CF substrate (20) facing the TFT substrate (10) and having a flexible second plastic substrate (13); and a liquid crystal layer (25) provided between the TFT substrate (10) and the CF substrate (20). The liquid crystal display panel (1) includes a metal layer (15) provided on a surface of the second plastic substrate (13) which faces the terminal region (T) to reflect laser light, and a protection film (16) sandwiched between the TFT substrate (10) and the CF substrate (20) to cover the metal layer (15).

13 Claims, 11 Drawing Sheets

DISPLAY PANEL AND METHOD FOR FABRICATING SAME

TECHNICAL FIELD

The present disclosure relates to display panels in which a pair of substrates are joined together with a predetermined gap interposed therebetween and a display medium layer is enclosed in the gap between the pair of substrates, and methods for fabricating the display panels.

BACKGROUND ART

In recent years, liquid crystal display panels which have advantages such as thin thickness, light weight, low-voltage drive, and lower power consumption have been widely used as display panels for various electronic apparatuses such as mobile terminals (e.g., mobile telephones and mobile game machines) and notebook personal computers.

In the field of displays, in recent years, considerable attention has been directed to display panels which include a plastic substrate having great advantages over glass substrates in terms of flexibility, shock resistance, and light weight, and to potential novel display panels which could not be produced using a glass substrate.

As such a display panel, for example, a liquid crystal display panel which includes a pair of substrates (i.e., a thin film transistor (TFT) substrate and a color filter (CF) substrate) and a liquid crystal layer provided between the pair of substrates, and in which each of the TFT substrate and the CF substrate has a flexible plastic substrate made, for example, of a translucent resin material, has been suggested.

Here, in fabricating a liquid crystal display panel, the liquid crystal display panel needs to be provided with a terminal to be connected to e.g., an integrated circuit chip (or an IC chip), which is an electronic component, and a picture-frame region (i.e., a terminal region) where the terminal is provided needs to be exposed. In this case, unwanted portions of one of the pair of substrates, i.e., the CF substrate and the TFT substrate, (e.g., the CF substrate if the terminal is provided on the TFT substrate) need to be cut off.

As a cutting technique for exposing the terminal region of the liquid crystal display panel including a plastic substrate, techniques such as cutting by a dicing saw, or punching using a cutting die has been used.

However, in these techniques, accurate height positioning of the saw and the stage, and flatness are required so that the CF substrate is completely cut off without causing any damage to a wire electrode on the TFT substrate. Thus, it is difficult to increase size and production scale.

As a substitute for these techniques, a technique of cutting the plastic substrate by irradiation with laser light has been suggested. The cutting technique by irradiation with laser light has been proved to be capable of cutting one layer of the plastic substrate, and cutting the TFT substrate and the CF substrate at the same points when the two substrates are bonded together as a bonded body, due to optimization of conditions of the laser light irradiation.

However, as mentioned above, the plastic substrate is made of a translucent resin material, and therefore, in cutting a portion of the CF substrate which corresponds to the terminal region by irradiation with laser light, the wire electrode in the terminal region on the TFT substrate may be irradiated with the laser light, which may result in causing damage to the wire electrode and breaking the wire.

In view of this problem, a method for preventing the breakage of the wire due to irradiation with laser light has been suggested. More specifically, as a liquid crystal display panel having a TFT substrate including a terminal region in which a terminal and a wire are provided, and a CF substrate facing the TFT substrate, a liquid crystal display panel in which a metal layer for reflecting laser light is provided on an inner surface of the CF substrate which faces the terminal region has been suggested. It is described in Patent Document 1, for example, that with this configuration, it is possible to reduce damage to the terminal region due to irradiation with laser light, and improve the quality and reliability of the liquid crystal display panel.

CITATION LIST

Patent Document

Patent Document 1: Japanese Patent Publication No. 2009-98425

SUMMARY OF THE INVENTION

Technical Problem

In the liquid crystal display panel shown in Patent Document 1, it is possible to prevent damage to the wire electrode due to the irradiation of the wire electrode with laser light. However, because of a gap between the metal layer provided on the CF substrate and the wire electrode provided on the TFT substrate, the metal layer may be dispersed due to the laser light irradiation, for example, and the metal layer and the wire electrode may be thus electrically connected. This may cause a leakage current and migration (a phenomenon in which the metal that forms the wire electrode is ionized and eluted by an electrochemical reaction, and is precipitated and grows in an area that is different from the area where the wire electrode is originally placed), and therefore insulation degradation.

The present disclosure is thus intended to provide a display panel in which it is possible to prevent a leakage current and migration in cutting a portion of a CF substrate which corresponds to a terminal region by laser light irradiation, and a method for fabricating the display panel.

Solution to the Problem

To achieve the above objective, a display panel of the present disclosure includes: a first substrate which includes a flexible first plastic substrate and a terminal region on the first plastic substrate where a terminal and a wire electrode are formed; a second substrate which faces the first substrate and includes a flexible second plastic substrate; and a display medium layer provided between the first substrate and the second substrate, wherein the display panel includes a metal layer provided on a surface of the second plastic substrate which faces the terminal region to reflect laser light, and a protection film sandwiched between the first substrate and the second substrate to cover the metal layer.

According to this configuration, for example, in cutting a portion of the second substrate which corresponds to the terminal region by laser light, the laser light is reflected by the metal layer, and it is possible to prevent the laser light from coming into the wire electrode provided on the first substrate.

Further, the protection film which covers the metal layer can prevent the metal layer from being dispersed under the impact of the irradiation of the laser light in cutting the portion of the second substrate which corresponds to the terminal region by the laser light. The protection film can also ensure a cell gap between the first substrate and the second substrate, thereby preventing the contact between the metal layer and the wire electrode. Thus, the wire electrode can be protected. As a result, it is possible to prevent a leakage current and migration due to contact between the metal layer and the wire electrode.

In the display panel of the present disclosure, the metal layer may be made of a material selected from the group consisting of titanium (Ti), aluminum (Al), chromium (Cr), nickel (Ni), silver (Ag), molybdenum (Mo), an aluminum oxide ($Al_2O_3$), an aluminum alloy, and a silver alloy.

According to this configuration, the metal layer can be formed using a low cost and versatile material.

In the display panel of the present disclosure, a thickness of the metal layer may be 100 nm or more.

According to this configuration, since the metal layer has a sufficient thickness, a reflectance of the laser light on the metal layer can be increased.

In the display panel of the present disclosure, the protection film may be made of a material selected from the group consisting of a silicon nitride, a silicon oxide, a silicon oxynitride, a silicon nitride oxide, an epoxy resin, and an acrylic resin.

According to this configuration, the protection film can be formed using a low cost and versatile material. In particular, by using an acrylic resin which can be easily shaped, a cell gap between the first substrate and the second substrate can be ensured, and it is possible to reliably prevent the contact between the metal layer and the wire electrode.

In the display panel of the present disclosure, the protection film may include a laser light absorbing film which covers the metal layer, and a resin film provided on the wire electrode and layered on the laser light absorbing film.

According to this configuration, even if part of the laser light passes through the metal layer, the laser light having passed through the metal layer can be absorbed in the laser light absorbing film, and therefore, it is possible to reliably prevent the wire electrode from being irradiated with the laser light.

The laser light absorbing film and the resin film layered on the laser light absorbing film can ensure a cell gap between the first substrate and the second substrate. Thus, it is possible to prevent the contact between the metal layer and the wire electrode.

In the display panel of the present disclosure, the laser light absorbing film may be made of a resin material in which at least a material selected from the group consisting of a metal material, a light-absorbing pigment, and a light-absorbing dye is dispersed.

According to this configuration, the laser light absorbing film can be formed using a low cost and versatile material.

In the display panel of the present disclosure, the resin film may be made of an epoxy resin or an acrylic resin.

According to this configuration, the resin film can be formed using a low cost and versatile material. In particular, by using an acrylic resin which can be easily shaped, a cell gap between the first substrate and the second substrate can be ensured, and it is possible to reliably prevent the contact between the metal layer and the wire electrode.

In the display panel of the present disclosure, a second metal layer which reflects laser light may be provided on a surface of the laser light absorbing film which faces the first substrate, and a second laser light absorbing film which covers the second metal layer may be provided between the laser light absorbing film and the resin film.

According to this configuration, even if part of the laser light passes through the metal layer and the laser light absorbing film, the laser light having passed through the metal layer and the laser light absorbing film can be reflected by the second metal layer, and therefore, it is possible to prevent the wire electrode from being irradiated with the laser light with more reliability.

Moreover, even if part of the laser light passes through the second metal layer, the laser light having passed through the second metal layer can be absorbed in the second laser light absorbing film, and therefore, it is possible to prevent the wire electrode from being irradiated with the laser light with more reliability.

Further, since the laser light absorbing film, the second laser light absorbing film, and the resin film are layered, a cell gap between the first substrate and the second substrate can be ensured, and it is possible to prevent the contact between the metal layer and the wire electrode.

In the display panel of the present disclosure, the second metal layer may be made of a material selected from the group consisting of titanium (Ti), aluminum (Al), chromium (Cr), nickel (Ni), silver (Ag), molybdenum (Mo), an aluminum oxide ($Al_2O_3$), an aluminum alloy, and a silver alloy.

According to this configuration, the second metal layer can be formed using a low cost and versatile material.

In the display panel of the present disclosure, a thickness of the second metal layer may be 100 nm or more.

According to this configuration, since the second metal layer has a sufficient thickness, a reflectance of the laser light on the second metal layer can be increased.

In the display panel of the present disclosure, the second laser light absorbing film may be made of a resin material in which at least a material selected from the group consisting of a metal material, a light-absorbing pigment, and a light-absorbing dye is dispersed.

According to this configuration, the second laser light absorbing film can be formed using a low cost and versatile material.

The display panel of the present disclosure has superior characteristics in which it is possible to prevent laser light from coming into the wire electrode provided on the first substrate when a portion of the second substrate which corresponds to the terminal region is cut by the laser light, and prevent a leakage current and migration due to contact between the metal layer and the wire electrode. Thus, the display panel of the present disclosure is preferably used as a display panel in which a liquid crystal layer is used as the display medium layer.

A second display panel of the present disclosure includes: a first substrate which includes a flexible first plastic substrate and a terminal region on the first plastic substrate where a terminal and a wire electrode are formed; a second substrate which faces the first substrate and includes a flexible second plastic substrate; and a display medium layer provided between the first substrate and the second substrate, wherein the display panel includes an oxide semiconductor film provided on a surface of the second plastic substrate which faces the terminal region to reflect laser light, and a protection film sandwiched between the first substrate and the second substrate to cover the oxide semiconductor film.

According to this configuration, for example, in cutting a portion of the second substrate which corresponds to the terminal region by laser light, the laser light is reflected by the oxide semiconductor film, and it is possible to prevent the laser light from coming into the wire electrode provided on the first substrate.

Further, the protection film which covers the oxide semiconductor film can prevent the oxide semiconductor film from being dispersed under the impact of the irradiation of the laser light in cutting the portion of the second substrate which corresponds to the terminal region by the laser light. The protection film can also ensure a cell gap between the first substrate and the second substrate, thereby preventing the contact between the oxide semiconductor film and the wire electrode. Thus, the wire electrode can be protected. As a result, it is possible to prevent a leakage current and migration due to the contact between the oxide semiconductor film and the wire electrode.

In the second display panel of the present disclosure, the protection film may include a laser light absorbing film which covers the oxide semiconductor film, and a resin film provided on the wire electrode and layered on the laser light absorbing film.

According to this configuration, even if part of the laser light passes through the oxide semiconductor film, the laser light having passed through the oxide semiconductor film can be absorbed in the laser light absorbing film, and therefore, it is possible to reliably prevent the wire electrode from being irradiated with the laser light.

The laser light absorbing film and the resin film layered on the laser light absorbing film can ensure a cell gap between the first substrate and the second substrate. Thus, it is possible to prevent the contact between the oxide semiconductor film and the wire electrode.

In the second display panel of the present disclosure, a second oxide semiconductor film which reflects laser light may be provided on a surface of the laser light absorbing film which faces the first substrate, and a second laser light absorbing film which covers the second oxide semiconductor film may be provided between the laser light absorbing film and the resin film.

According to this configuration, even if part of the laser light passes through the oxide semiconductor film and the laser light absorbing film, the laser light having passed the oxide semiconductor film and the laser light absorbing film can be reflected by the second oxide semiconductor film. Thus, it is possible to prevent the wire electrode from being irradiated with the laser light with more reliability.

Moreover, even if part of the laser light passes through the second oxide semiconductor film, the laser light having passed through the second oxide semiconductor film can be absorbed in the second laser light absorbing film. Thus, it is possible to prevent the wire electrode from being irradiated with the laser light with more reliability.

Since the laser light absorbing film, the second laser light absorbing film, and the resin film are layered, a cell gap between the first substrate and the second substrate can be ensured, and it is possible to prevent the contact between the oxide semiconductor film and the wire electrode.

A method for fabricating a display panel of the present disclosure at least includes: forming a first substrate on a flexible first plastic substrate, the first substrate including a terminal region where a terminal and a wire electrode are formed; forming a second substrate by forming a metal layer so as to be placed over a cutting line of a flexible second plastic substrate to reflect laser light, and then by forming a protection film so as to cover the metal layer; applying a sealing material in a frame-like shape onto the second substrate, and then dropping a display medium in an area inside the sealing material; bonding the second substrate to which the display medium has been dropped and the first substrate together, with the sealing material interposed therebetween, such that the metal layer is located on a surface of the second plastic substrate which faces the terminal region; and cutting the second plastic substrate by irradiating a region where the metal layer is located with laser light along the cutting line from a second substrate side toward a first substrate side.

According to this method, it is possible to provide a display panel in which in cutting a portion of the second substrate which corresponds to the terminal region by laser light, the laser light can be reflected by the metal layer, and therefore it is possible to prevent the laser light from coming into the wire electrode provided on the first substrate.

Further, the protection film which covers the metal layer can prevent the metal layer from being dispersed under the impact of the irradiation of the laser light in cutting the portion of the second substrate which corresponds to the terminal region by the laser light. The protection film can also ensure a cell gap between the first substrate and the second substrate, thereby preventing the contact between the metal layer and the wire electrode. Thus, the wire electrode can be protected. As a result, it is possible to provide the display panel in which it is possible to prevent a leakage current and migration due to contact between the metal layer and the wire electrode.

A second method for fabricating a display panel of the present disclosure at least includes: forming a first substrate on a flexible first plastic substrate, the first substrate including a terminal region where a terminal and a wire electrode are formed; forming a second substrate by forming an oxide semiconductor film so as to be placed over a cutting line of a flexible second plastic substrate to reflect laser light, and then by forming a protection film so as to cover the oxide semiconductor film; applying a sealing material in a frame-like shape onto the second substrate, and then dropping a display medium in an area inside the sealing material; bonding the second substrate to which the display medium has been dropped and the first substrate together, with the sealing material interposed therebetween, such that the oxide semiconductor film is located on a surface of the second plastic substrate which faces the terminal region; and cutting the second plastic substrate by irradiating a region where the oxide semiconductor film is located with laser light along the cutting line from a second substrate side to a first substrate side.

According to this method, it is possible to provide a display panel in which in cutting a portion of the second substrate which corresponds to the terminal region by laser light, the laser light is reflected by the oxide semiconductor film, and therefore it is possible to prevent the laser light from coming into the wire electrode provided on the first substrate.

Further, the protection film which covers the oxide semiconductor film can prevent the oxide semiconductor film from being dispersed under the impact of the irradiation of the laser light in cutting the portion of the second substrate which corresponds to the terminal region by the laser light. The protection film can also ensure a cell gap between the first substrate and the second substrate, thereby preventing the contact between the oxide semiconductor film and the wire electrode. Thus, the wire electrode can be protected. As a result, it is possible to provide a display panel in which it is possible to prevent a leakage current and migration due to contact between the oxide semiconductor film and the wire electrode.

In the second method of the display panel of the present disclosure, a wavelength of the laser light may be equal to or greater than a mid-infrared wavelength.

Advantages of the Invention

According to the present disclosure, it is possible to prevent laser light from coming into a wire electrode provided on a first substrate, in cutting a second substrate which corresponds to a terminal region by the laser light. It is also possible to prevent a leakage current and migration due to contact between a metal layer for reflecting the laser light and the wire electrode, and contact of metal layer fragments formed by dispersion of the metal layer with the wire electrode.

DESCRIPTION OF EMBODIMENTS

Embodiments of the present disclosure will be described in detail below based on the drawings. The present disclosure is not limited to the embodiments below.

First Embodiment

Figure 1:
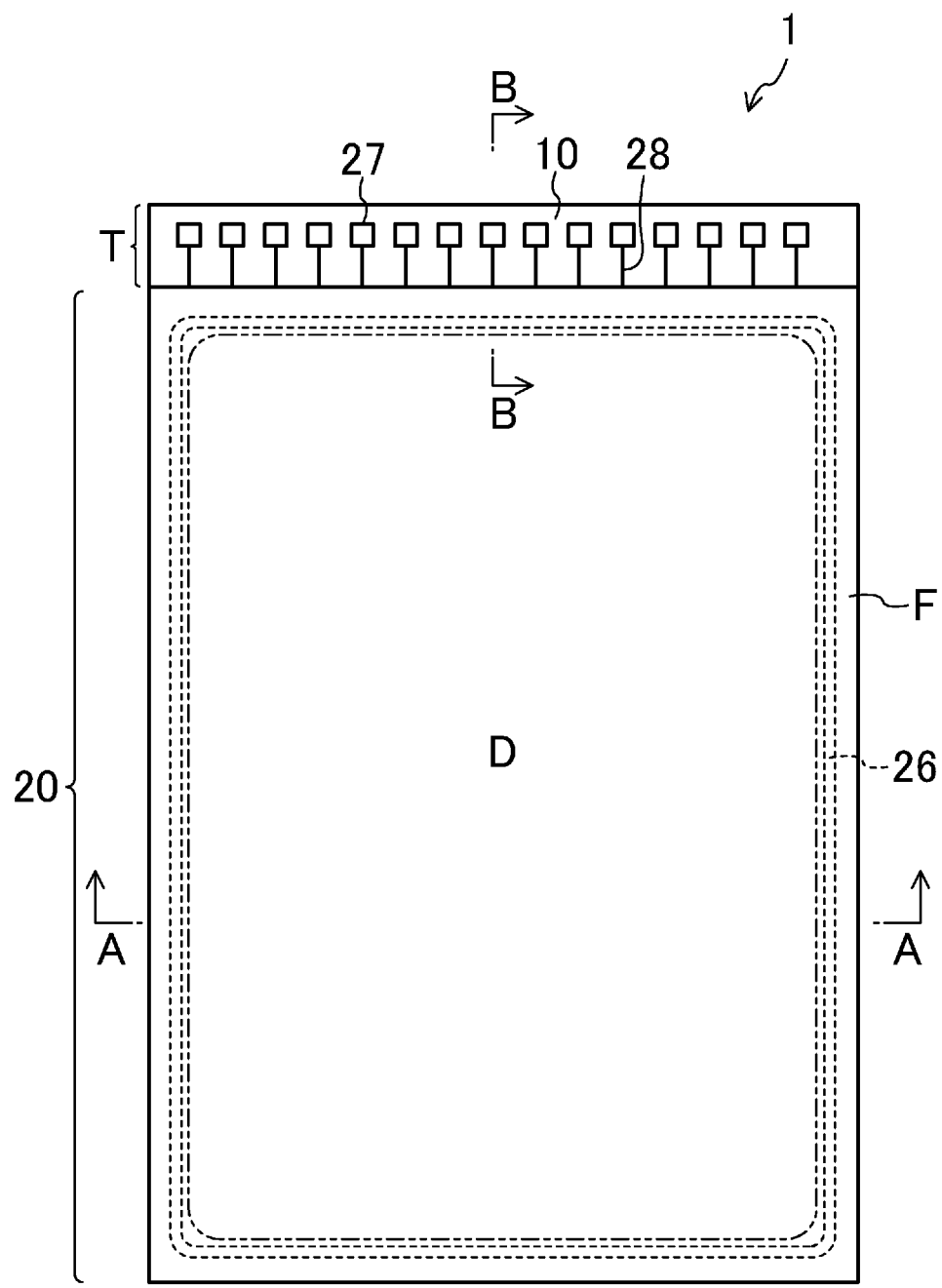
FIG. 1 is a plan view of a liquid crystal display panel of the first embodiment of the present disclosure.
Figure 2:
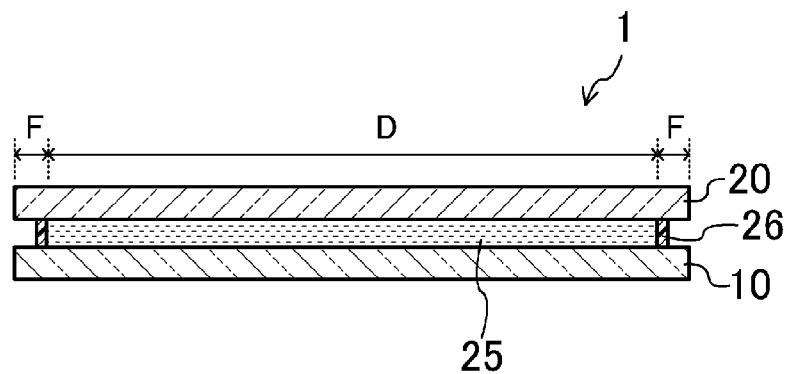
FIG. 2 is a cross-sectional view taken along the line A-A of FIG. 1.
Figure 3:
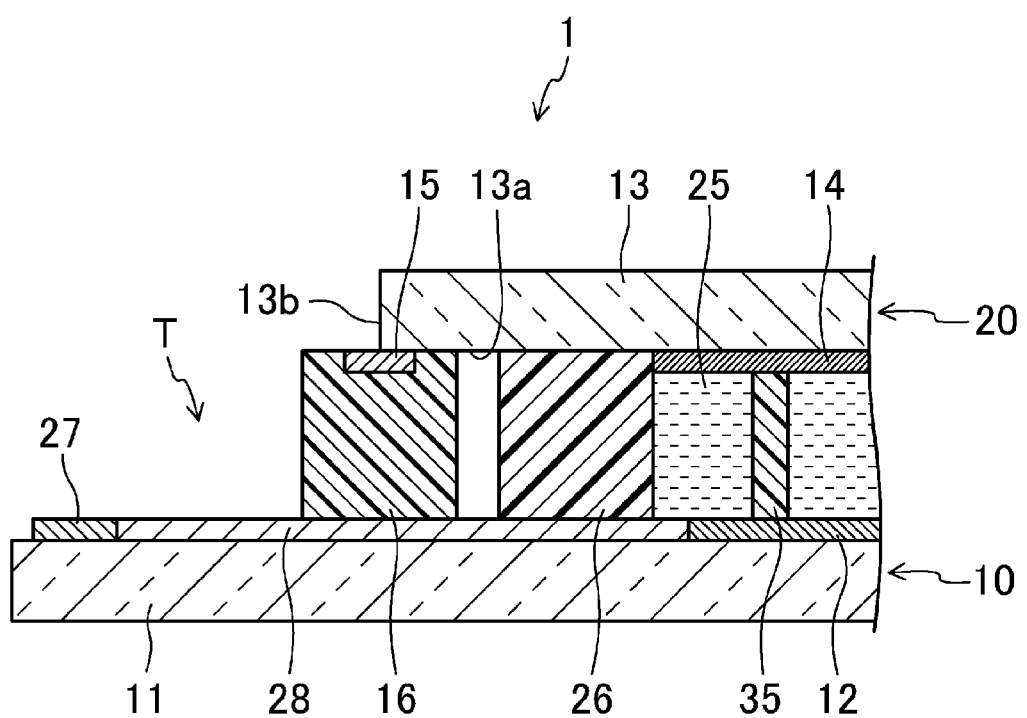
FIG. 3 is a cross-sectional view taken along the line B-B of FIG. 1.

FIG. 1 is a plan view of a liquid crystal display panel of the first embodiment of the present disclosure. FIG. 2 is a cross-sectional view taken along the line A-A of FIG. 1. FIG. 3 a cross-sectional view taken along the line B-B of FIG. 1.

As shown in FIG. 1 and FIG. 2, a liquid crystal display panel 1 includes: a TFT substrate 10 as a first substrate; a CF substrate 20 as a second substrate provided to face the TFT substrate 10; a liquid crystal layer 25 as a display medium layer provided between the TFT substrate 10 and the CF substrate 20; and a frame-like sealing material 26 sandwiched between the TFT substrate 10 and the CF substrate 20 to bond the TFT substrate 10 and the CF substrate 20 and enclose the liquid crystal layer 25.

The sealing material 26 is provided so as to surround the liquid crystal layer 25, and the TFT substrate 10 and the CF substrate 20 are bonded to each other via the sealing material 26.

As shown in FIG. 1, the liquid crystal display panel 1 is configured such that the upper side of the TFT substrate 10 protrudes from the CF substrate 20, and such that the projected region of the TFT substrate 10 is defined as a terminal region T where a plurality of terminals 27 that activate the liquid crystal display panel 1 are provided.

A plurality of connecting wire electrodes 28 which are connected to the plurality of terminals 27 are also provided in the terminal region T.

In the liquid crystal display panel 1, the region where the TFT substrate 10 and the CF substrate 20 overlap each other is defined as a display region (or a central region) D which displays an image. The display region D includes a plurality of pixels, each of which is a minimum unit of an image, arranged in a matrix. As shown in FIG. 1, the TFT substrate 10 includes a picture-frame region F which surrounds the display region D and displays no image.

The TFT substrate 10 includes a film-like first plastic substrate 11 made of a resin material having flexibility. The resin material forming the first plastic substrate 11 may be, for example, an organic material such as acrylic, polyimide, polyetherimide, polyamidimide, polyether sulfone, cyanate ester, cyclic polyolefin, and a copolymer of the material.

The material for the first plastic substrate 11 may be another resin, such as polyester, polyamide, and polycarbonate, or may appropriately contain a lubricant, a thermal stabilizer, a weathering stabilizer, a pigment, a dye, an inorganic filler, etc., as long as the material has a glass transition temperature of 200° C. or more and capable of being used as a material on which a TFT device for driving can be formed.

The above-mentioned terminals 27 and wire electrodes 28 are provided on the first plastic substrate 11, which means that the TFT substrate 10 includes the terminal region T where the terminal 27 and the wire electrodes 28 are provided on the first plastic substrate 11.

The TFT substrate 10 includes: a plurality of gate lines (not shown) provided on the first plastic substrate 11 and extending in parallel to each other; a gate insulating film (not shown) which covers the gate lines; a plurality of source lines (not shown) provided on the gate insulating film and extending in parallel to each other in a direction perpendicular to the gate lines; a plurality of TFTs (not shown) each provided for the intersection of the gate line and the source line; an interlayer insulating film (not shown) which covers the source lines and the TFTs; a plurality of pixel electrodes 12 provided on the interlayer insulating film in a matrix and connected to the respective TFTs; and an alignment film (not shown) which covers the pixel electrodes 12.

Each of the TFTs includes: a gate electrode (not shown) which is a laterally protruding portion of the gate line; an island-shaped semiconductor layer (not shown) provided on the gate insulating film at a location which overlaps the gate electrode; and a source electrode (not shown) and a drain electrode (not shown) provided on the semiconductor layer so as to face each other.

The drain electrode is connected to the pixel electrode 12 via a contact hole (not shown) formed in the interlayer insulating film. The wire electrode 28 is made of a metal which forms the gate line or a metal which forms the source line, and is connected to the gate electrode and the source electrode of each TFT via the gate line and the source line.

An integrated circuit chip (or a driver IC chip), which is an electronic component, is connected to the terminal 27. A signal from the external driver IC is sent to the wire electrode 28 from the terminal 27, and is supplied to the pixel electrode 12.

The CF substrate 20 includes a film-like second plastic substrate 13 made of a resin material having flexibility, similar to the TFT substrate 10. The second plastic substrate 13 needs to be transparent. The resin material forming the second plastic substrate 13 may be, for example, a transparent organic material such as acrylic, epoxy, polyether sulfone, polycarbonate, cyclic polyolefin, and polyimide.

The thickness of each of the first and second plastic substrates 11, 13 is preferably 200 μm or less, and more preferably 50 μm or less, in terms of ensuring flexibility.

The first plastic substrate 11 does not need to have transparency, but if the liquid crystal display panel 1 is of a transmissive type, the first plastic substrate 11 needs to have transparency. In this case, a resin material similar to the resin material as used for the transparent second plastic substrate 13 may be used as a resin material for the first plastic substrate 11.

The CF substrate 20 includes: a black matrix (not shown) provided on the second plastic substrate 13 in a grid pattern and in a frame-like shape as a light shielding portion; a color filter (not shown) including red, green, and blue layers provided between the grid lines of the black matrix; a counter electrode 14 which covers the black matrix and the color filter; a columnar spacer 35 provided on the counter electrode 14; and an alignment film (not shown) which covers the counter electrode 14.

The spacer 35 may be provided on the gate line or the source line on the TFT substrate 10.

The liquid crystal layer 25 is made of a nematic liquid crystal material having electro-optic characteristics, for example.

As shown in FIG. 1, the sealing material 26 is in a rectangular frame-like shape which surrounds the entire display region D. The sealing material 26 is made of a photocurable resin, a photocurable/thermosetting resin, or a thermosetting resin. The frame width of the sealing material 26 is not particularly limited, but may be set to 0.5 mm or more and 2.0 mm or less.

In the liquid crystal display panel 1, one pixel is provided for each pixel electrode 12, and a predetermined voltage is applied to the liquid crystal layer 25 for each pixel to change the aligned state of the liquid crystal layer 25, and adjust, for example, the transmittance of light coming from the backlight unit, and whereby an image is displayed.

As shown in FIG. 3, the present embodiment is characterized in that a metal layer 15 which reflects laser light is provided on a surface 13a of the second plastic substrate 13 which faces the terminal region T where the wire electrodes 28 and the terminals 27 are formed (that is, a surface of the second plastic substrate 13 which faces the TFT substrate 10), and further in that a protection film 16 sandwiched between the TFT substrate 10 and the CF substrate 20 and covering the metal layer 15 is provided.

As shown in FIG. 3, the metal layer 15 is provided on the surface 13a of the second plastic substrate 13 which faces the TFT substrate 10, and is positioned so as to protrude toward the terminal region T from near the sealing material 26 and cover a boundary surface 13b of the CF substrate 20 (that is, a boundary surface of the second plastic substrate 13).

As shown in FIG. 3, the protection film 16 is sandwiched between the TFT substrate 10 and the CF substrate 20, and protrudes toward the terminal region T from near the sealing material 26, similar to the metal layer 15.

The metal layer 15 is intended to reflect laser light so that the laser light is prevented from coming into the TFT substrate 10 and the wire electrodes 28 when a portion of the CF substrate 20 which corresponds to the terminal region T is cut by the laser light.

Materials for the metal layer 15 are not particularly limited as long as the material reflects laser light, and may be, for example, a metal material such as titanium (Ti), aluminum (Al), chromium (Cr), nickel (Ni), silver (Ag), molybdenum (Mo), and an aluminum oxide ($Al_2O_3$), and an alloy material such as an aluminum alloy and a silver alloy.

The thickness of the metal layer 15 is preferably 100 nm or more, and more preferably 500 nm or more, in terms of increasing a reflectance of the laser light on the metal layer 15.

The protection film 16 is intended to prevent the metal layer 15 from being dispersed under the impact of irradiation with the laser light when the portion of the CF substrate 20 which corresponds to the terminal region T is cut by the laser light. The protection film 16 can prevent the contact between the metal layer 15 and the wire electrode 28, and prevent a leakage current and migration due to the contact between the metal layer 15 and the wire electrode 28.

Materials for the protection film 16 may include an insulating inorganic material, such as silicon nitride (SiNx), silicon oxide (SiOx), silicon oxynitride (SiOxNy, x>y), and silicon nitride oxide (SiNxOy, x>y), and an insulating resin material, such as an epoxy resin and an acrylic resin.

In particular, it is preferable to use, for example, an insulating resin such as an acrylic resin which can be easily shaped, in terms of ensuring a cell gap between the TFT substrate 10 and the CF substrate 20 and reliably preventing the contact between the metal layer 15 and the wire electrode 28.

If the spacer 35 mentioned above is made, for example, of an acrylic-based photosensitive resin and is formed by photolithography, the protection film 16 may be made of the acrylic-based photosensitive resin which forms the spacer 35.

Figure 4:
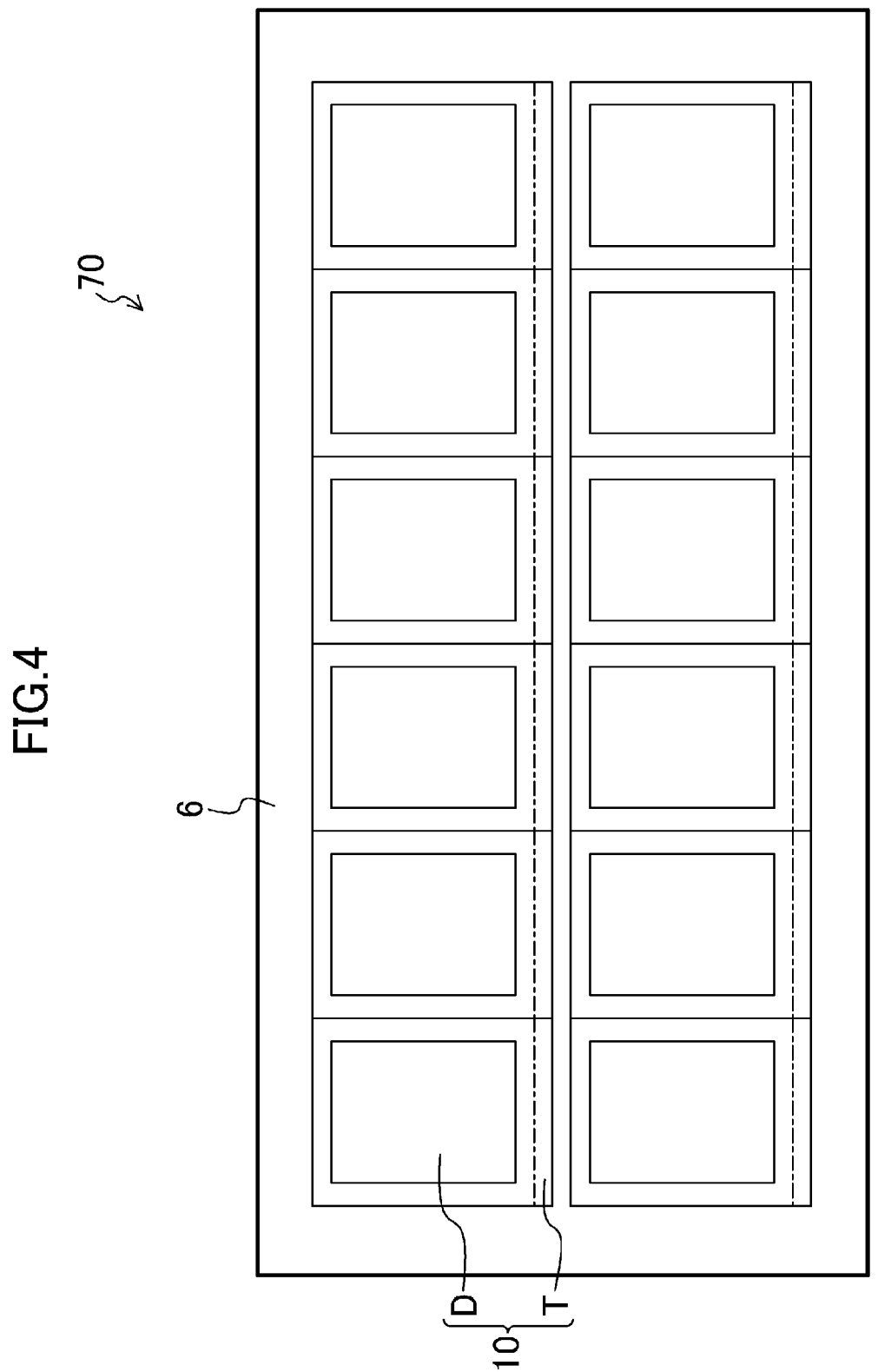
FIG. 4 is a plan view of a TFT mother substrate from which the liquid crystal display panel of the first embodiment of the present disclosure is fabricated.
Figure 5:
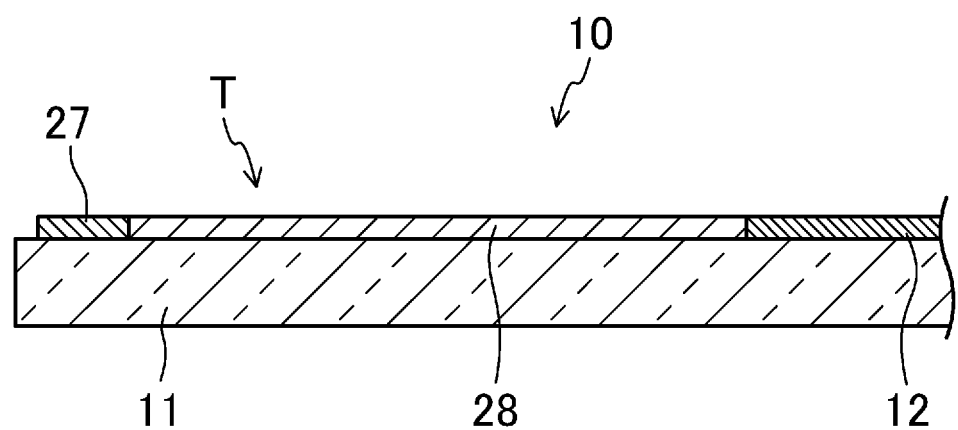
FIG. 5 is a cross-sectional view for illustrating a TFT substrate of the liquid crystal display panel of the first embodiment of the present disclosure.
Figure 6:
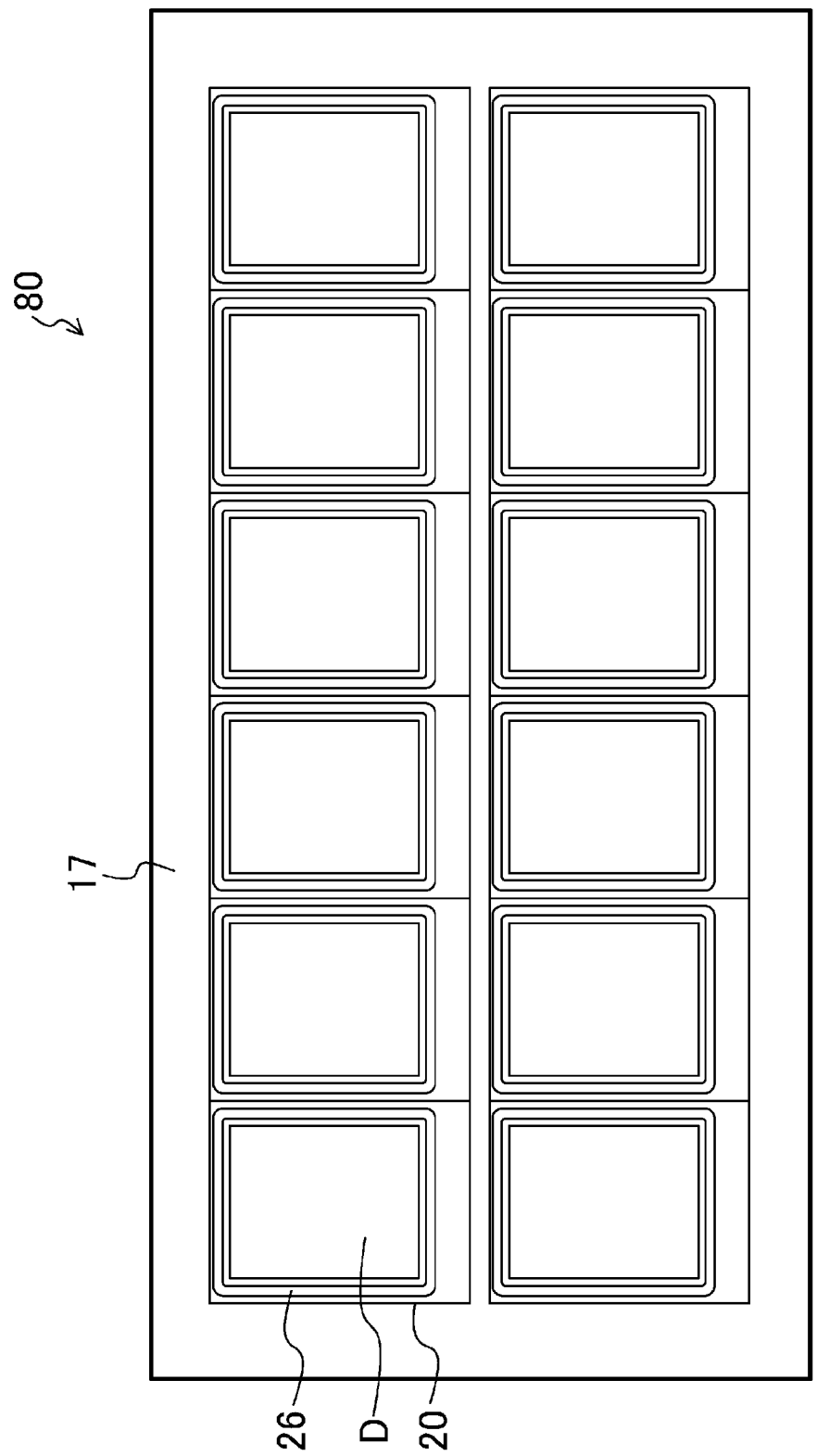
FIG. 6 is a plan view of a CF mother substrate from which the liquid crystal display panel of the first embodiment of the present disclosure is fabricated.

Now, an example method for fabricating the liquid crystal display panel of the present embodiment will be described. FIG. 4 is a plan view of a TFT mother substrate from which the liquid crystal display panel of the first embodiment of the present disclosure is fabricated. FIG. 5 is a cross-sectional view for illustrating the TFT substrate of the liquid crystal display panel of the first embodiment of the present disclosure. FIG. 6 is a plan view of a CF mother substrate from which the liquid crystal display panel of the first embodiment of the present disclosure is fabricated. FIG. 7 to FIG. 11 show cross-sectional views for illustrating a method for fabricating the liquid crystal display panel of the first embodiment of the present disclosure. The fabrication method of the present embodiment includes a mother substrate fabrication step, a sealing material formation step, a liquid crystal material filling step, a bonded body formation step, a mother substrate cutting step, and a terminal portion exposure step.

<Mother Substrate Fabrication Step>

For example, TFTs, pixel electrodes, etc. are patterned on a substrate body 6 made of the first plastic substrate 11 to form a plurality of active element layers each comprising a display region D. Thereafter, an alignment film is formed over the active element layers, whereby a TFT mother substrate 70 on which the plurality of display regions D and terminal regions T are defined in a matrix pattern is fabricated as shown in FIG. 4.

Here, the terminals 27 and the wire electrodes 28 are monolithically formed using a known technique. In the present embodiment, twelve TFT substrates 10 shown in FIG. 5 are fabricated from one TFT mother substrate 70 shown in FIG. 4.

Further, for example, a black matrix, a color filter, a counter electrode 14, a spacer 35, etc. are patterned on a substrate body 17 made of the second plastic substrate 13 to form a plurality of CF element layers each comprising a display region D. Thereafter, an alignment film is formed over the CF element layers, whereby a CF mother substrate 80 on which the plurality of display regions D are defined in a matrix pattern is fabricated as shown in FIG. 6.

Figure 7:
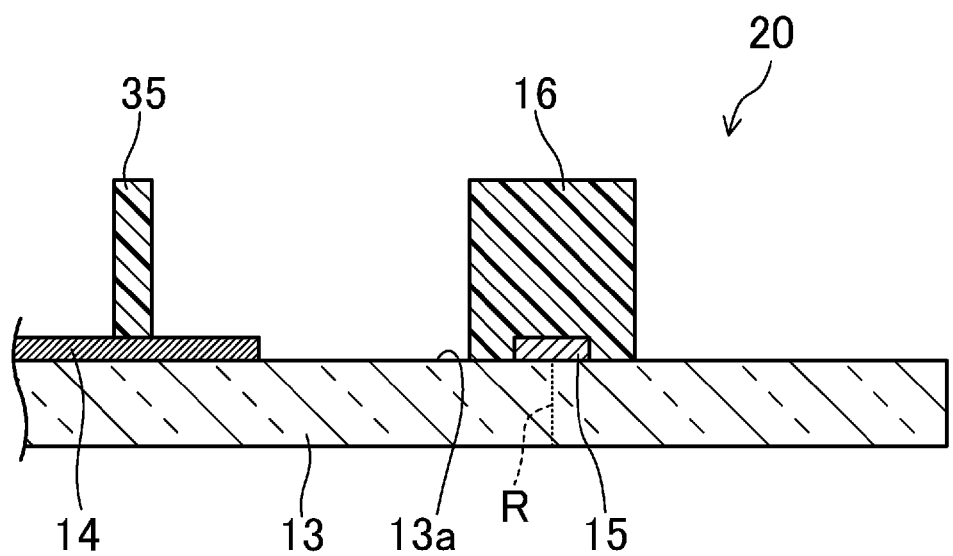
FIG. 7 is a cross-sectional view for illustrating a method for fabricating the liquid crystal display panel of the first embodiment of the present disclosure.

In the present embodiment, twelve CF substrates 20 shown in FIG. 7 are fabricated from one CF mother substrate 80 shown in FIG. 6.

In the present embodiment, the metal layer 15 is formed so as to be placed over a cutting line R of the CF substrate 20 (i.e., a cutting line of the second plastic substrate 13), and the protection film 16 is formed so as to cover the metal layer 15, as shown in FIG. 7.

The metal layer 15 is formed on the second plastic substrate 13 by, for example, photolithography. The protection film 16 is formed by photolithography, for example, simultaneously with the formation of the spacer 35 using the acrylic-based photosensitive resin which forms the spacer 35, as described above.

The black matrix is made of a metal material, such as tantalum (Ta), chromium (Cr), molybdenum (Mo), nickel (Ni), titanium (Ti), copper (Cu), aluminum (Al), gold (Au), tin (Sn), iron (Fe), and an alloy of the metal, or a resin material in which a black pigment such as carbon is dispersed.

The counter electrode 14 is formed by forming an indium tin oxide (ITO) film by, for example, sputtering and thereafter patterning by photolithography.

<Sealing Material Formation Step>

Next, a sealing material 26 is applied, in a frame-like shape, onto the picture-frame region F at four sides of the CF substrate 20, using a dispenser, for example. At this moment, the sealing material 26 is formed to have a frame-like shape along the four sides of the CF substrate 20 without being in contact with the edges of the CF substrate 20 and the display region D as shown in FIG. 6 and FIG. 8.

Figure 8:
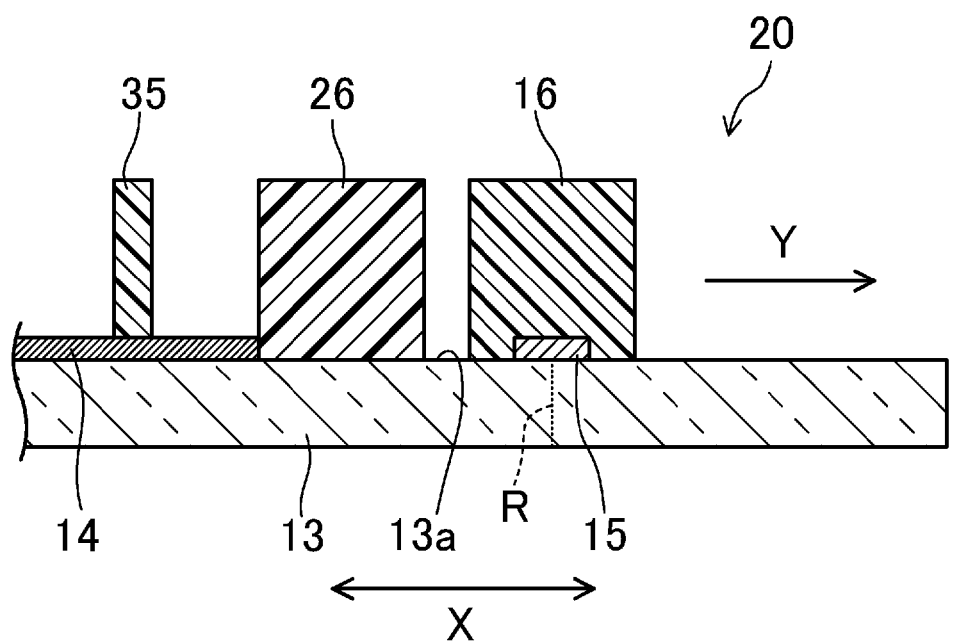
FIG. 8 is a cross-sectional view for illustrating a method for fabricating the liquid crystal display panel of the first embodiment of the present disclosure.

The sealing material 26 is disposed such that the metal layer 15 and the protection film 16 are located outside the sealing material 26 in a width direction X of the sealing material 26 (i.e., at a location on the Y direction side of the sealing material 26 in the width direction X) as shown in FIG. 8.

Another method for forming the sealing material 26 may be screen printing, but there are disadvantages such as distortion or breakage of the screen printing plate, or contamination of the substrate due to contact of the screen printing plate with the substrate. Thus, in forming an active matrix type liquid crystal display panel in which the picture-frame region F has a narrow width and in which control of impurities in the liquid crystal material is required, it is suitable to apply a drawing method using a dispenser with high accuracy in the drawing position without coming in contact with the substrate.

<Liquid Crystal Material Filling Step>

Next, an area inside each display region D of the CF substrate 20 formed in the CF mother substrate 80 (i.e., an area inside the sealing material 26) is filled with a liquid crystal material, which is a display medium, by dropping the liquid crystal material into the area in a vacuum atmosphere. The dropping of the liquid crystal material is performed, for example, by a dropping device moving across the entire substrate surface while dropping a liquid crystal material.

If the sealing material 26 is drawn on the TFT substrate 10 and the liquid crystal material is dropped thereafter into the area inside the sealing material 26, dropping marks may be easily formed, and circuitry, etc. on the TFT substrate 10 may be damaged by static electricity. Thus, preferably, the sealing material 26 is drawn on the CF substrate 20 and the liquid crystal material is dropped thereafter, as in the present embodiment.

<Bonded Body Formation Step>

First, the CF substrate 20 on which the liquid crystal material has been dropped in the liquid crystal material filling step and the TFT substrate 10 fabricated in the TFT substrate fabrication step are bonded together under reduced pressure such that the respective display regions D are overlapped, with the sealing material 26 interposed therebetween.

Then, the bonded body is released in the atmospheric pressure to diffuse the liquid crystal material and form the liquid crystal layer 25, and make the sealing material 26 and the TFT substrate 10 adhere to each other.

Then, the picture-frame region F of the bonded body is irradiated with light to temporarily cure the sealing material 26, and thereafter the sealing material 26 is completely cured by heating, thereby bonding the TFT mother substrate 70 and the CF mother substrate 80 together, and forming a bonded body in which the liquid crystal layer 25 is enclosed.

<Cutting Step>

Figure 9:
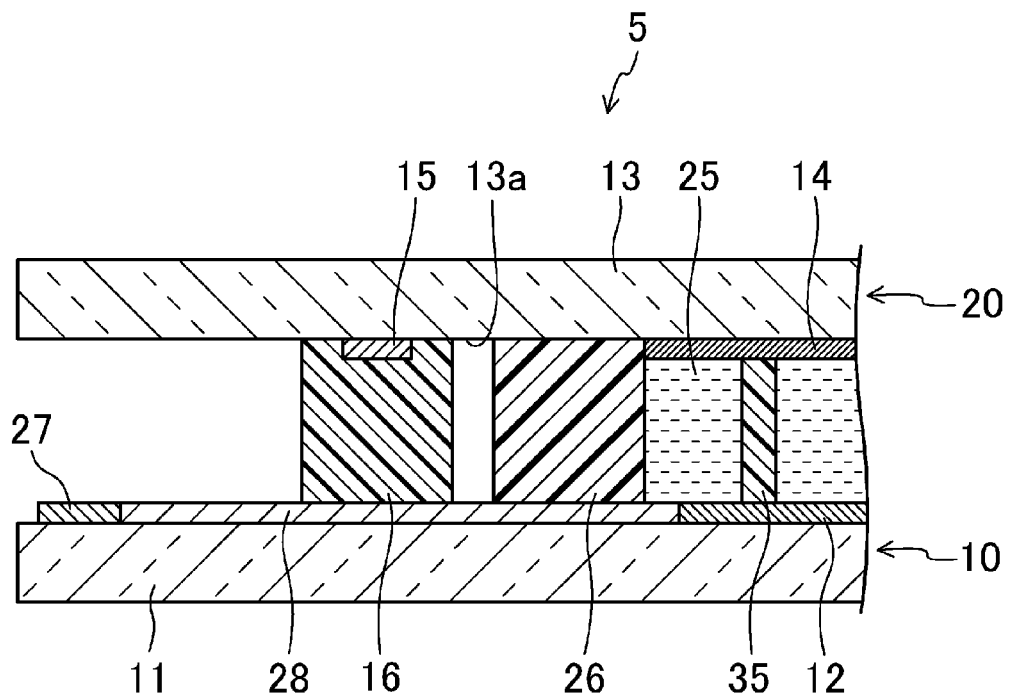
FIG. 9 is a cross-sectional view for illustrating a method for fabricating the liquid crystal display panel of the first embodiment of the present disclosure.

Next, the front surface, or the front surface and the back surface of the bonded body is irradiated with laser light to cut the bonded body into display regions D and fabricate a liquid crystal display panel 5 shown in FIG. 9 in the state before cutting of the CF substrate 20.

<Terminal Portion Exposure Step>

Figure 10:
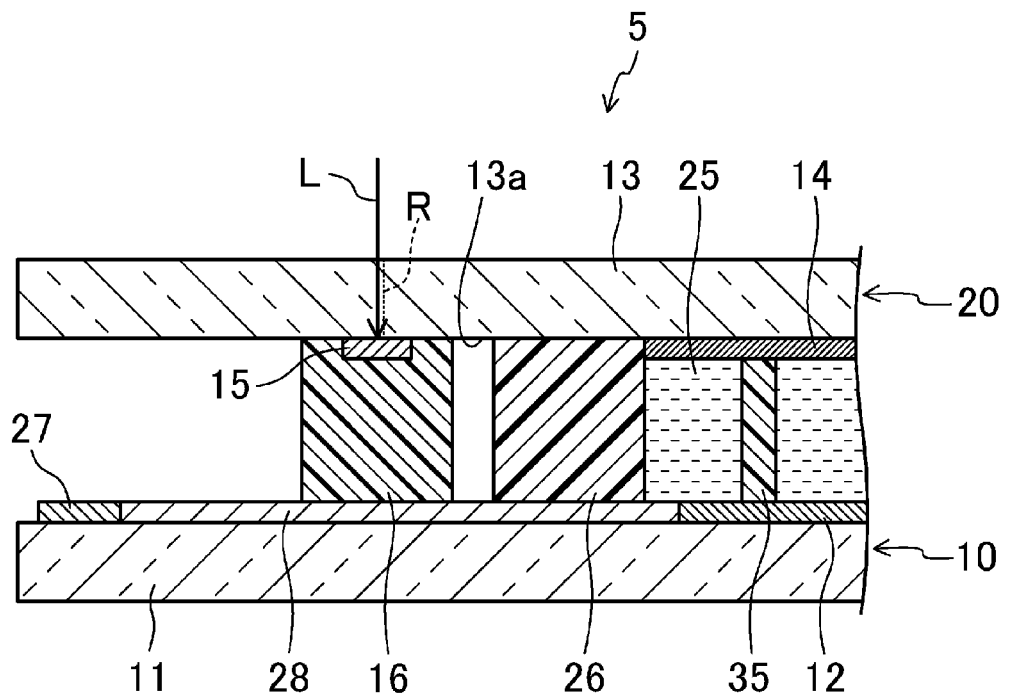
FIG. 10 is a cross-sectional view for illustrating a method for fabricating the liquid crystal display panel of the first embodiment of the present disclosure.

First, as shown in FIG. 10, a region of the liquid crystal display panel 5 in the state before cutting of the CF substrate 20 in which region the metal layer 15 is positioned is irradiated with laser light L along the cutting line R, from the CF substrate 20 side toward the TFT substrate 10.

In the present embodiment, as mentioned above, the metal layer 15 which reflects the laser light L is provided on the surface 13*a* of the second plastic substrate 13 which faces the terminal region T. Thus, the laser light L which has come into the CF substrate 20 is reflected by the metal layer 15.

Thus, the TFT substrate 10 and the wire electrode 28 located under the metal layer 15 are not irradiated with the laser light L, which means that the TFT substrate 10 and the wire electrode 28 are prevented from being damaged by the laser light L.

Figure 11:
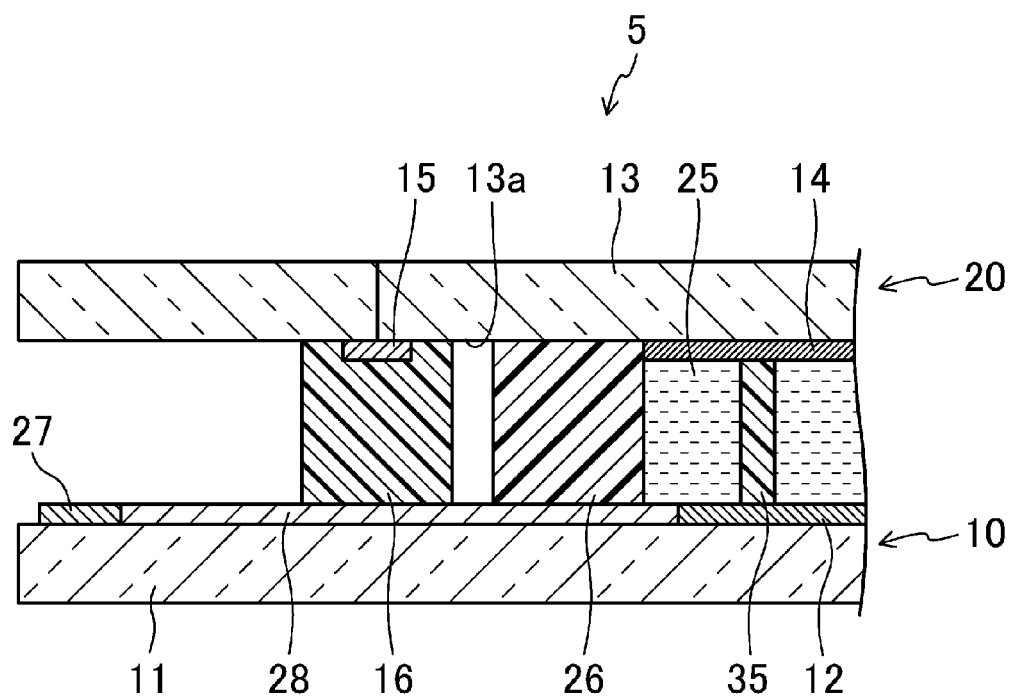
FIG. 11 is a cross-sectional view for illustrating a method for fabricating the liquid crystal display panel of the first embodiment of the present disclosure.

As a result, only the CF substrate 20 (i.e., only the second plastic substrate 13) is cut by irradiation with the laser light L as shown in FIG. 11.

In addition, the protection film 16 which covers the metal layer 15 is provided on wire electrode 28 and between the TFT substrate 10 and the CF substrate 20. Thus, the metal layer 15 can be prevented from being dispersed under the impact of the irradiation with the laser light L when the portion of the CF substrate 20 which corresponds to the terminal region T is cut by the laser light L.

Moreover, the protection film 16 sandwiched between the TFT substrate 10 and the CF substrate 20 can ensure a cell gap between the TFT substrate 10 and the CF substrate 20. Thus, it is possible to prevent the contact between the metal layer 15 and the wire electrode 28, and a leakage current and migration.

The liquid crystal display panel 1 shown in FIG. 1 to FIG. 3 is obtained in the foregoing manner.

The present embodiment described above can obtain the following advantages.

(1) In the present embodiment, the metal layer 15 which reflects laser light is provided on the surface 13a of the second plastic substrate 13 which faces the terminal region T. Further, the protection film 16 which covers the metal layer 15 is sandwiched between the TFT substrate 10 and the CF substrate 20. Thus, in cutting a portion of the CF substrate 20 which corresponds to the terminal region T by laser light, the laser light is reflected by the metal layer 15 and is prevented from coming into the wire electrode 28 provided on the TFT substrate 10.

Further, the protection film 16 which covers the metal layer 15 can prevent the metal layer 15 from being dispersed under the impact of the irradiation with the laser light in cutting the portion of the CF substrate 20 which corresponds to the terminal region T by laser light. Moreover, the wire electrode 28 can be protected because the protection film 16 can ensure a cell gap between the TFT substrate 10 and the CF substrate 20, and prevent the contact between the metal layer 15 and the wire electrode 28. Consequently, it is possible to prevent a leakage current and migration due to contact between the metal layer 15 and the wire electrode 28.

(2) In the present embodiment, the metal layer 15 is made of a material selected from the group consisting of titanium (Ti), aluminum (Al), chromium (Cr), nickel (Ni), silver (Ag), molybdenum (Mo), an aluminum oxide ($Al_2O_3$), an aluminum alloy, and a silver alloy. Thus, the metal layer 15 can be formed using a low cost and versatile material.

(3) In the present embodiment, the thickness of the metal layer 15 is set to 100 nm or more. Since the metal layer 15 has a sufficient thickness, a reflectance of the laser light on the metal layer 15 can be increased.

(4) In the present embodiment, the protection film 16 is made of a material selected from the group consisting of silicon nitride, silicon oxide, silicon oxynitride, silicon nitride oxide, epoxy resin, and acrylic resin. Thus, the protection film 16 can be formed using a low cost and versatile material. In particular, by using an acrylic resin which can be easily shaped, a cell gap between the TFT substrate 10 and the CF substrate 20 can be ensured, and it is possible to reliably prevent the contact between the metal layer 15 and the wire electrode 28.

Second Embodiment

Figure 12:
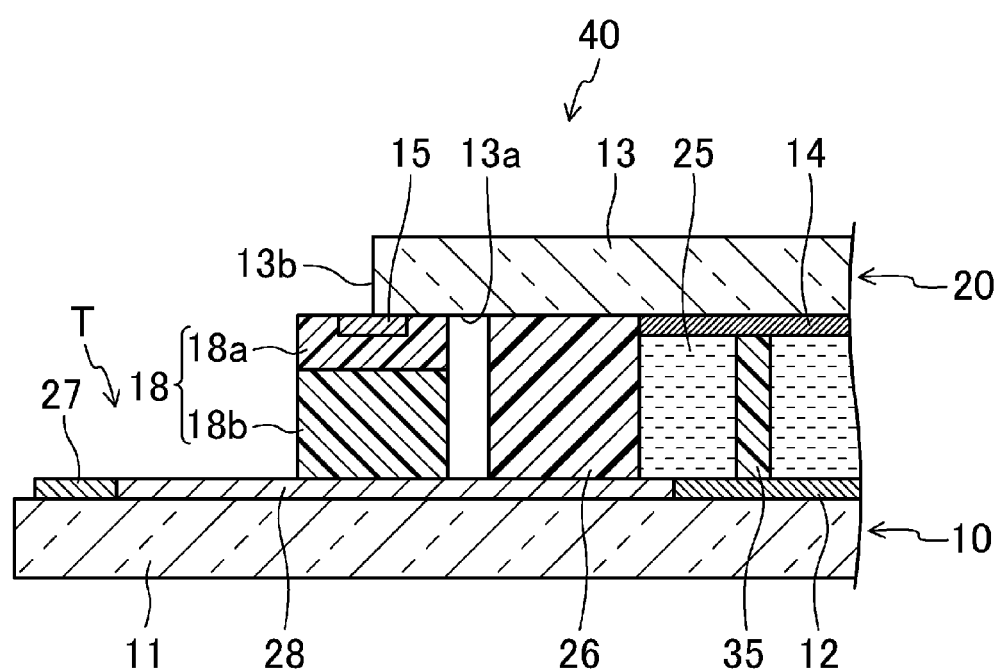
FIG. 12 is a cross-sectional view of a liquid crystal display panel of the second embodiment of the present disclosure.

Now, the second embodiment of the present disclosure will be described. FIG. 12 is a cross-sectional view of a liquid crystal display panel of the second embodiment of the present disclosure. Like reference characters have been used to designate similar elements in the first embodiment, and explanation thereof is omitted. The general configuration of the liquid crystal display panel is similar to the configuration described in the first embodiment. Thus, detailed explanation thereof is omitted here.

As shown in FIG. 12, a liquid crystal display panel 40 of the present embodiment is similar to the liquid crystal display panel of the first embodiment in that a protection film 18 which covers a metal layer 15 is provided on the wire electrode 28, but the liquid crystal display panel 40 of the present embodiment is characterized in that the protection film 18 includes a laser light absorbing film 18a which covers the metal layer 15, and a resin film 18b provided on the wire electrode 28 and layered on the laser light absorbing film 18a.

The laser light absorbing film 18a in the protection film 18 is intended to absorb laser light having passed through the metal layer 15 when a portion of the CF substrate 20 which corresponds to the terminal region T is cut by the laser light, to reliably prevent the wire electrode 28 from being irradiated with the laser light, and reliably prevent the wire electrode 28 from being damaged by the laser light irradiation.

Specifically, the laser light used in cutting the portion of the CF substrate 20 which corresponds to the terminal region T is reflected by the metal layer 15. However, in some cases, the laser light may not be completely reflected by the metal layer 15, depending on the combination of a type of the laser light, conditions of the irradiation, and the metal layer 15, for example. If the laser light is not completely reflected, the laser light passes through the metal layer 15, and the wire electrode may be damaged by the laser light.

To avoid this, the laser light absorbing film 18a which covers the metal layer 15 is provided in the present embodiment to absorb the laser light having passed through the metal layer 15, and reliably prevent the wire electrode 28 from being irradiated with the laser light.

Similar to the first embodiment, the laser light absorbing film 18a which covers the metal layer 15 can also prevent the metal layer 15 from being dispersed under the impact of the irradiation with the laser light in cutting the portion of the CF substrate 20 which corresponds to the terminal region T.

The resin film 18b layered on the laser light absorbing film 18a, as well as the laser light absorbing film 18a, ensure a cell gap between the first plastic substrate 11 and the second plastic substrate 13, thereby preventing the contact between the metal layer 15 and the wire electrode 28.

Materials for the laser light absorbing film 18a are not specifically limited as long as the material absorbs laser light, and may include, for example, a resin material that forms the black matrix mentioned above, a metal material, and a resin material in which a light-absorbing pigment, such as carbon black, and a light-absorbing dye are dispersed.

Materials for the resin film 18b may include an insulating resin material, such as an epoxy resin and an acrylic resin, as used for the protection film 16 in the first embodiment.

For example, if the spacer 35 is made of an acrylic photosensitive resin, and is formed by photolithography, the resin film 18b may be made of the acrylic photosensitive resin which forms the spacer 35.

In a method for fabricating the liquid crystal display panel 40 of the present embodiment, the metal layer 15 is formed in a manner similar to the method in the first embodiment when the CF substrate 20 is formed in the mother substrate fabrication step. Thereafter, a positive photosensitive resin material in which a black pigment such as carbon fine particles is dispersed is applied by, for example, spin coating. The applied photosensitive resin is exposed to light through a photomask, and is developed and heated, thereby forming the laser light absorbing film 18a made of the photosensitive resin material which forms the black matrix, simultaneously with the formation of the black matrix.

Next, the resin film 18b made of the acrylic photosensitive resin which forms the spacer 35 is formed by photolithography, etc., in a manner similar to the method for forming the protection film 16 in the first embodiment, simultaneously with the formation of the spacer 35.

Then, similar to the first embodiment, a sealing material formation step, a liquid crystal material filling step, a bonded body formation step, a cutting step, and a terminal portion exposure step are performed, thereby fabricating the liquid crystal display panel 40 shown in FIG. 12.

The present embodiment described above can obtain the following advantages in addition to the advantages (1) to (3) described above.

(5) In the present embodiment, the protection film 18 includes the laser light absorbing film 18a which covers the metal layer 15, and the resin film 18b provided on the wire electrode 28 and layered on the laser light absorbing film 18a. Thus, even if part of the laser light passes through the metal layer 15, the laser light having passed through the metal layer 15 can be absorbed by the laser light absorbing film 18a, and therefore, it is possible to reliably prevent the wire electrode 28 from being irradiated with the laser light.

(6) Further, the laser light absorbing film 18a and the resin film 18b layered on the laser light absorbing film 18a can ensure a cell gap between the TFT substrate 10 and the CF substrate 20. Thus, it is possible to prevent the contact between the metal layer 15 and the wire electrode 28.

(7) In the present embodiment, the laser light absorbing film 18a is made of a resin material in which at least one selected from the group consisting of a metal material, a light-absorbing pigment, and a light-absorbing dye is dispersed. Thus, the laser light absorbing film 18a can be formed using a low cost and versatile material.

(8) In the present embodiment, the resin film 18b is made of an epoxy resin or an acrylic resin. Thus, the resin film 18b can be formed using a low cost and versatile material. In particular, by using an acrylic resin which can be easily shaped, a cell gap between the TFT substrate 10 and the CF substrate 20 can be ensured, and it is possible to reliably prevent the contact between the metal layer 15 and the wire electrode 28.

Third Embodiment

Figure 13:
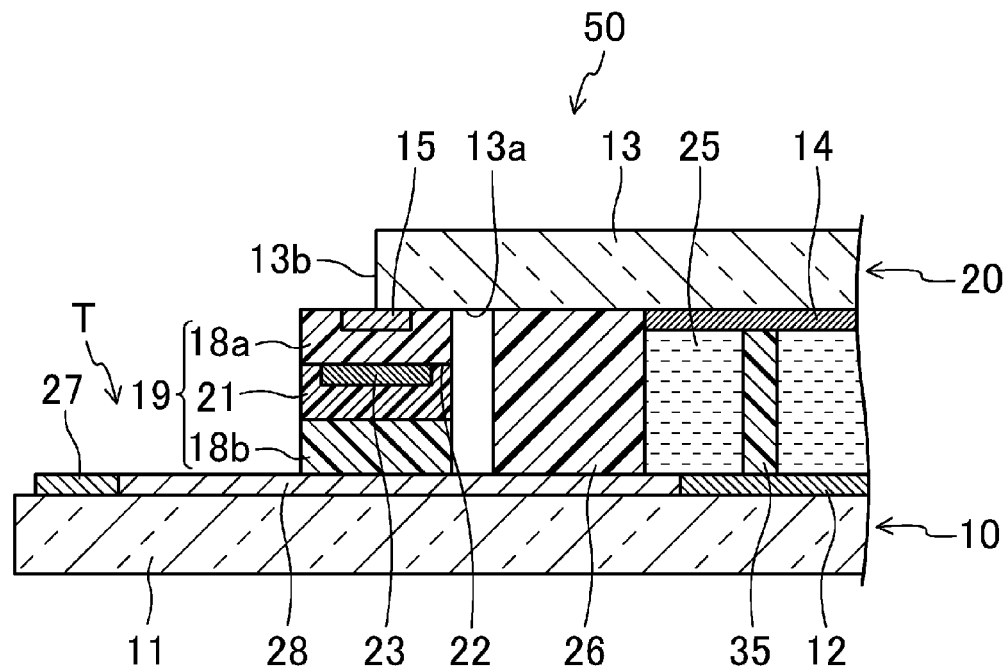
FIG. 13 is a cross-sectional view of a liquid crystal display panel of the third embodiment of the present disclosure.

Now, the third embodiment of the present disclosure will be described. FIG. 13 is a cross-sectional view of a liquid crystal display panel of the third embodiment of the present disclosure. Like reference characters have been used to designate similar elements in the first embodiment and the second embodiment, and explanation thereof is omitted. The general configuration of the liquid crystal display panel is similar to the configuration described in the first embodiment. Thus, detailed explanation thereof is omitted here.

As shown in FIG. 13, a liquid crystal display panel 50 of the present embodiment is similar to the liquid crystal display panels of the first and second embodiments in that a protection film 19 which covers the metal layer 15 is provided on the wire electrode 28, but the liquid crystal display panel 50 of the present embodiment is characterized in that another metal layer (hereinafter simply referred to as a "metal layer") 23 which reflects laser light is provided on a surface 22 of the laser light absorbing film 18a which faces the TFT substrate 10, and in that another laser light absorbing film (hereinafter simply referred to as a "laser light absorbing film") 21 which covers the metal layer 23 is provided between the laser light absorbing film 18a and the resin film 18b in the protection film 19.

As shown in FIG. 13, the metal layer 23 is provided on the surface 22 of the laser light absorbing film 18a which faces the TFT substrate 10 so as to protrude toward the terminal region T from near the sealing material 26 and cover a boundary surface 13b of the CF substrate 20 (that is, a boundary surface of the second plastic substrate 13), similar to the metal layer 15.

Similar to the metal layer 15, the metal layer 23 is intended to reflect laser light so that the laser light is prevented from coming into the TFT substrate 10 and the wire electrode 28 with more reliability when a portion of the CF substrate 20 which corresponds to the terminal region T is cut by the laser light.

A material for the metal layer 23 may be the metal material or the alloy material which forms the metal layer 15.

The thickness of the metal layer 23 is preferably 100 nm or more, and more preferably 500 nm or more, in terms of increasing a reflectance of the laser light on the metal layer 23.

The laser light absorbing film 21 in the protection film 19 is intended to absorb laser light having passed through the metal layer 15, the laser light absorbing film 18a, and the metal layer 23 when a portion of the CF substrate 20 which corresponds to the terminal region T is cut by the laser light, to prevent the wire electrode 28 from being irradiated with the laser light with more reliability, and prevent the wire electrode 28 from being damaged by the laser light with more reliability.

Specifically, the laser light used in cutting the portion of the CF substrate 20 which corresponds to the terminal region T is reflected by the metal layer 15 and is absorbed in the laser light absorbing film 18a. However, in some cases, the laser light may not be completely reflected by the metal layer 15, and may not be completely absorbed in the laser light absorbing film 18a, depending on the combination of a type of the laser light, conditions of the irradiation, the metal layer 15, and the laser light absorbing film 18a, for example. In such a case, the laser light passes through the metal layer 15 and the laser light absorbing film 18a, and the wire electrode 28 may be damaged by the laser light.

To avoid this, the metal layer 23 is provided in the present embodiment to reflect the laser light having passed through the metal layer 15 and the laser light absorbing film 18a, and prevent the wire electrode 28 from being irradiated with the laser light with more reliability.

Further, in some cases, the laser light may not be completely reflected and absorbed by the metal layer 23, depending on the combination of a type of the laser light, conditions of the irradiation, the metal layer 15, the laser light absorbing film 18a, and the metal layer 23. As a result, the laser light may pass through the metal layer 23, and the wire electrode may be damaged by the laser light.

To avoid this, the laser light absorbing film 21 which covers the metal layer 23 is provided in the present embodiment to absorb the laser light having passed through the metal layer 23, and prevent the wire electrode 28 from being irradiated with the laser light with more reliability.

The laser light absorbing film 21 which covers the metal layer 23 can prevent the metal layer 23 from being dispersed under the impact of the irradiation with the laser light when the portion of the CF substrate 20 which corresponds to the terminal region T is cut.

A material similar to the material for the laser light absorbing film 18a can be used as a material for the laser light absorbing film 21.

In a method for fabricating the liquid crystal display panel 50 of the present embodiment, the metal layer 15 and the laser light absorbing film 18a are formed in the mother substrate fabrication step in a manner similar to the method in the second embodiment. After that, the metal layer 23 is formed on the surface 22 of the laser light absorbing film 18a which faces the TFT substrate 10 by, for example, photolithography.

Then, a positive photosensitive resin material in which a black pigment such as carbon fine particles is dispersed is applied by, for example, spin coating. The applied photosensitive resin is exposed to light through a photomask, and is developed and heated thereafter, thereby forming the laser light absorbing film 21 made of the photosensitive resin material which forms the black matrix.

Next, the resin film 18b made of the acrylic photosensitive resin which forms the spacer 35 is formed by photolithography, etc., in a manner similar to the method for forming the protection film 16 in the first embodiment, simultaneously with the formation of the spacer 35.

Then, similar to the first embodiment, a sealing material formation step, a liquid crystal material filling step, a bonded body formation step, a cutting step, and a CF substrate cutting step are performed, thereby fabricating the liquid crystal display panel 50 shown in FIG. 13.

The present embodiment described above can obtain the following advantages in addition to the advantages (1) to (3) and (5) to (8) described above.

(9) In the present embodiment, the metal layer 23 which reflects laser light is provided on the surface 22 of the laser light absorbing film 18a which faces the TFT substrate 10. Further, the laser light absorbing film 21 which covers the metal layer 23 is provided between the laser light absorbing film 18a and the resin film 18b. Thus, even if part of the laser light passes through the metal layer 15 and the laser light absorbing film 18a, the laser light having passed through the metal layer 15 and the laser light absorbing film 18a can be reflected by the metal layer 23, and therefore, it is possible to prevent the wire electrode 28 from being irradiated with the laser light with more reliability.

(10) Further, even if part of the laser light passes through the metal layer 23, the laser light having passed through the metal layer 23 can be absorbed in the laser light absorbing film 21, and therefore, it is possible to prevent the wire electrode 28 from being irradiated with the laser light with more reliability.

(11) The laser light absorbing film 18a, the laser light absorbing film 21, and the resin film 18b can ensure a cell gap between the TFT substrate 10 and the CF substrate 20. Thus, it is possible to prevent the contact between the metal layers 15, 23 and the wire electrode 28.

(12) In the present embodiment, the metal layer 23 is made of a material selected from the group consisting of titanium (Ti), aluminum (Al), chromium (Cr), nickel (Ni), silver (Ag), molybdenum (Mo), an aluminum oxide ($Al_2O_3$), an aluminum alloy, and a silver alloy. Thus, the metal layer 23 can be formed using a low cost and versatile material.

(13) In the present embodiment, the thickness of the metal layer 23 is set to 100 nm or more. Since the metal layer 23 has a sufficient thickness, a reflectance of the laser light on the metal layer 23 can be increased.

(14) In the present embodiment, the laser light absorbing film 21 is made of a resin material in which at least one selected from the group consisting of a metal material, a light-absorbing pigment, and a light-absorbing dye is dispersed. Thus, in this configuration, the laser light absorbing film 21 can be formed using a low cost and versatile material.

The above embodiments may be changed as follows.

In the above embodiments, the metal layer 15, 23 made of such as titanium (Ti) and aluminum (Al) is provided, but the metal layer 15, 23 may be replaced with an oxide semiconductor film.

Figure 14:
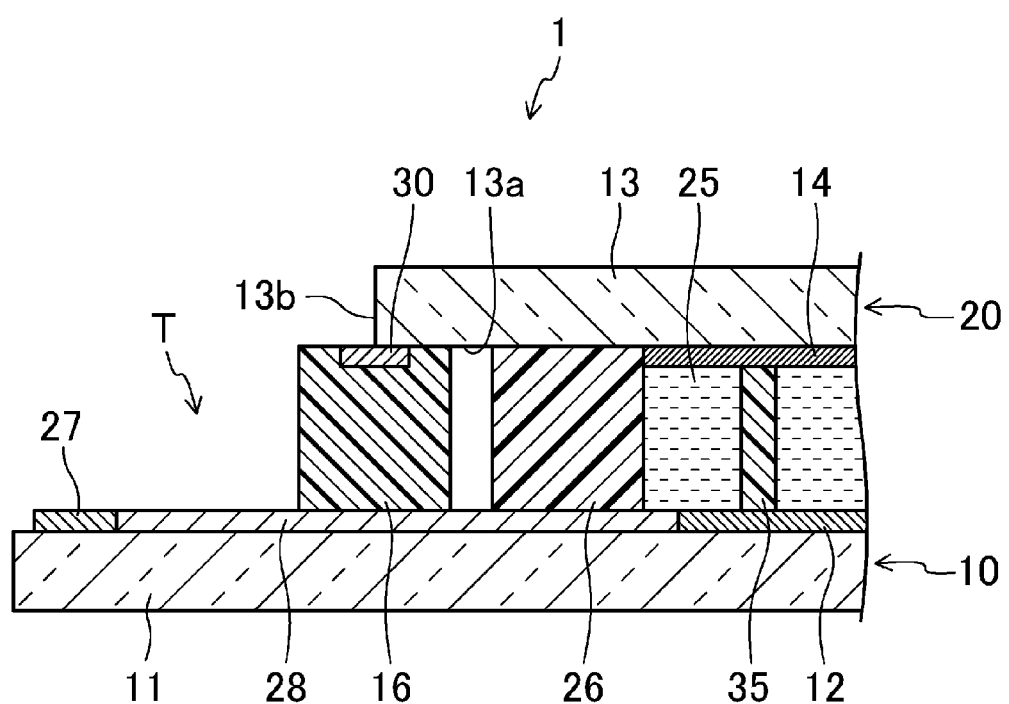
FIG. 14 is a cross-sectional view showing a variation of the liquid crystal display panel of the first embodiment of the present disclosure.
Figure 15:
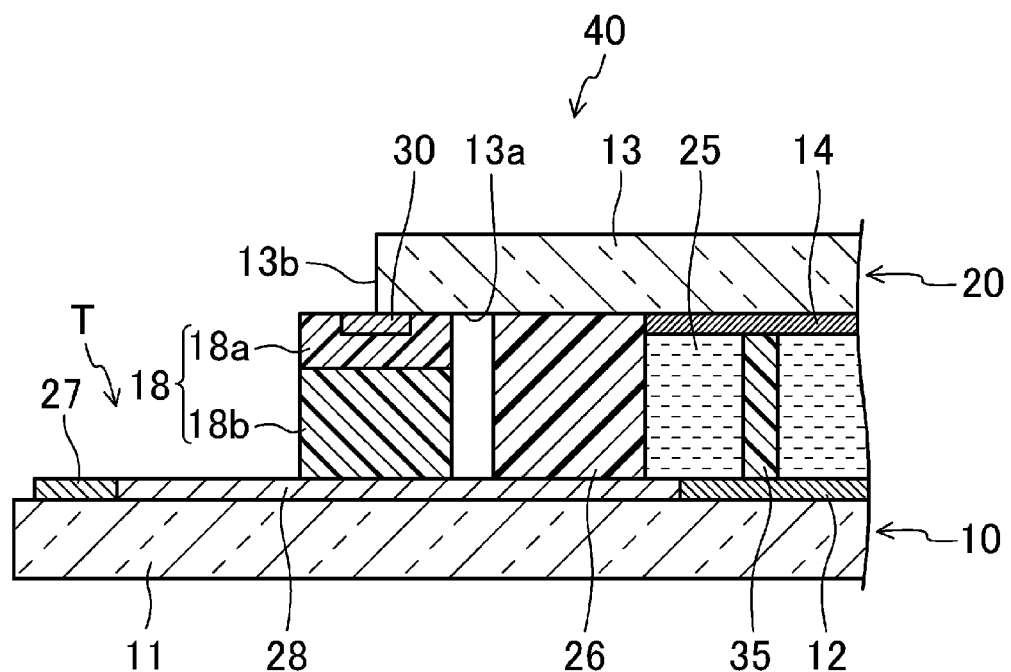
FIG. 15 is a cross-sectional view showing a variation of the liquid crystal display panel of the second embodiment of the present disclosure.
Figure 16:
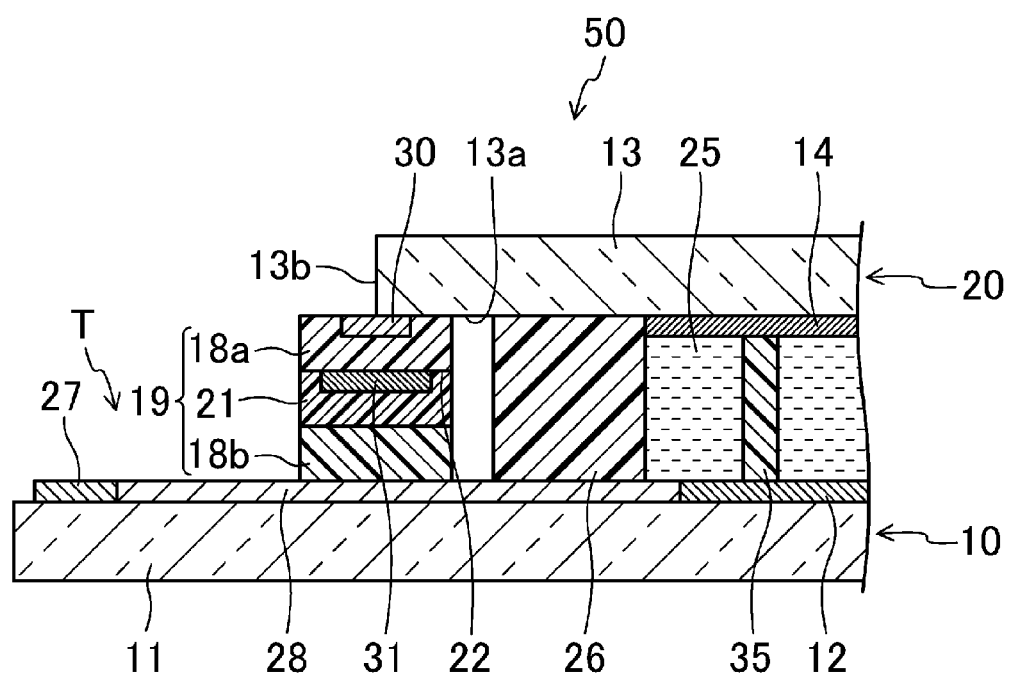
FIG. 16 is a cross-sectional view showing a variation of the liquid crystal display panel of the third embodiment of the present disclosure.

More specifically, as shown in FIG. 14 to FIG. 16, an oxide semiconductor film 30, 31 which reflects laser light may be provided on the surface 13a of the second plastic substrate 13 which faces the terminal region T, instead of providing the metal layer 15, 23 described in the first to third embodiments.

Materials for the oxide semiconductor film 30, 31 may be, for example, an indium tin oxide (ITO), an aluminum doped zinc oxide (AZO), a gallium doped zinc oxide (GZO), etc.

If the oxide semiconductor film 30 is made of the same material as the material for the counter electrode 14 (e.g., ITO), it is possible to form the oxide semiconductor film 30 on the second plastic substrate 13 in the same step in which the counter electrode 14 is formed.

In this case, however, it is preferable that the thickness of the oxide semiconductor film 30 is 150 nm or less, considering the effects on display by the counter electrode 14.

In the case of using the oxide semiconductor film 30, 31, it is preferable to use infrared laser as laser light L for cutting the second plastic substrate 13. Light having a wavelength of 2000 nm or more (more preferably, 2600 nm or more), that is, light having a wavelength equal to or greater than a mid-infrared wavelength is used as the infrared laser light for cutting.

Also in the case where the metal layer 15, 23 is replaced with the oxide semiconductor film 30, 31, advantages similar to the advantages in the first to third embodiments can be obtained.

Further, also in the case where the metal layer 15, 23 is replaced with the oxide semiconductor film 30, 31 which reflects laser light, the liquid crystal display panel 1, 40, 50 can be fabricated by the method similar to the method for forming the liquid crystal display panel where the metal layer 15, 23 is used.

Figure 17:
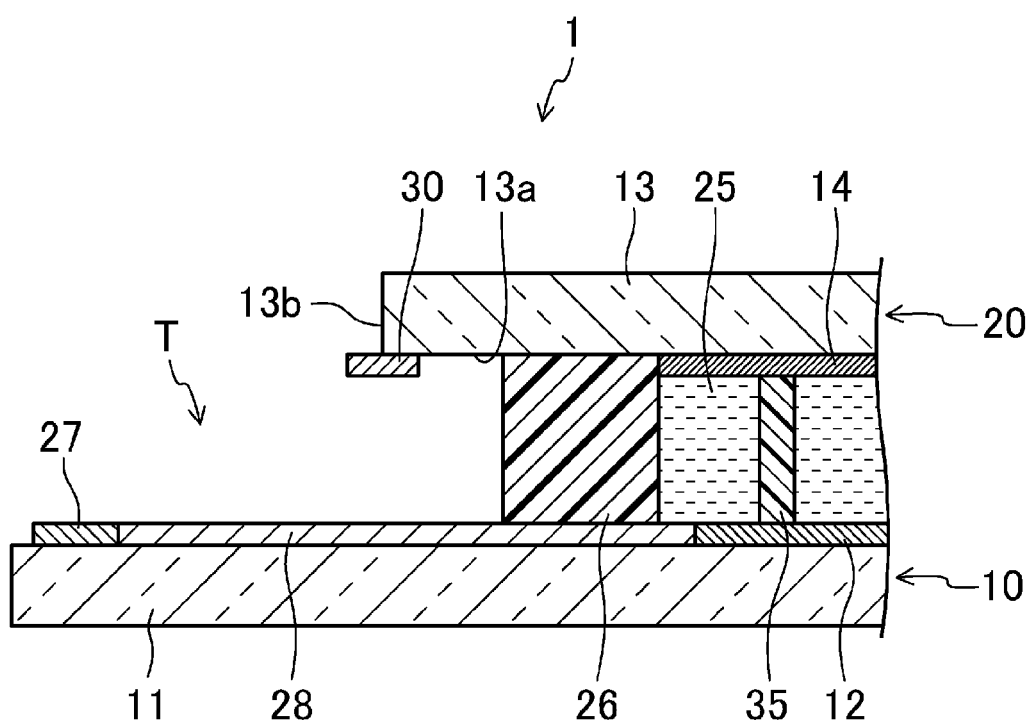
FIG. 17 is a cross-sectional view of a liquid crystal display panel of a variation of the present disclosure.

The protection film 16 which covers the oxide semiconductor film 30 as shown in the liquid crystal display panel 1 of FIG. 14 may not be provided, and only the oxide semiconductor film 30 may be provided as shown in FIG. 17.

In the above embodiments, the protection film 16 is formed on the second plastic substrate 13 so as to cover the metal layer 15 which is placed over the cutting line R of the CF substrate 20, as shown in FIG. 7, for example. However, the protection film 16 may be formed on the first plastic substrate 11 in the mother substrate fabrication step, and the CF substrate 20 and the TFT substrate 10 may be bonded together in the bonded body formation step such that the protection film 16 provided on the first plastic substrate 11 may cover the metal layer 15 provided on the second plastic substrate 13.

Similarly, in the case where the metal layer 15 is replaced with the oxide semiconductor film 30, the protection film 16 can be formed on the first plastic substrate 11 in the mother substrate fabrication step, and the CF substrate 20 and the TFT substrate 10 can be bonded together in the bonded body formation step such that the protection film 16 provided on the first plastic substrate 11 may cover the oxide semiconductor film 30 provided on the second plastic substrate 13.

In the above embodiments, a so-called "one drop filling" technique is used as a liquid crystal material filling technique, in which a liquid crystal material is supplied onto the CF substrate 20 by dropping, and thereafter the TFT substrate 10 and the CF substrate 20 are bonded together. However, a vacuum injection method may also be used, for example. In the vacuum injection method, the TFT substrate 10 and the CF substrate 20 are bonded together, with a sealing material 26 interposed therebetween, and the sealing material 26 is cured thereafter. Then, the liquid crystal material and the pair of substrates are placed in a vacuum chamber, and an injection hole formed in the sealing material 26 is immersed into the liquid crystal material to bring them in contact with each other. Then, the pressure in the chamber is returned to the atmospheric pressure to inject the liquid crystal between the two substrates.

In the third embodiments, two metal layers (i.e., the metal layers 15, 23) and two laser light absorbing films (i.e., the laser light absorbing films 18a, 21) are provided. However, the number of the metal layers and the number of the laser light absorbing films are not specifically limited, and for example, three or more metal layers and three or more laser light absorbing films may be provided.

In the above embodiments, the sealing material 26 is provided on the CF substrate 20, but the sealing material 26 may be provided on the TFT substrate 10. The sealing material 26 may also be provided on both of the TFT substrate 10 and the CF substrate 20.

In the above embodiments, liquid crystal display panels are illustrated as an example display panel, but the present disclosure can be applied to an organic EL display panel and other display panels using an electrowetting material, quick response liquid powder, etc.

INDUSTRIAL APPLICABILITY

The present disclosure may be used for a display panel and a method for forming the display panel in which a pair of substrates are overlaid with a predetermined gap interposed therebetween, and in which a display medium layer is enclosed in the gap between the pair of substrates.

DESCRIPTION OF REFERENCE CHARACTERS 1 liquid crystal display panel
10 TFT substrate (first substrate)
11 first plastic substrate
13 second plastic substrate
13a surface of second plastic substrate which faces terminal region
15 metal layer
16 protection film
18 protection film
18a laser light absorbing film
18b resin film
19 protection film
20 CF substrate (second substrate)
21 laser light absorbing film (second laser light absorbing film)
22 surface of laser light absorbing film which faces TFT substrate
23 metal layer (second metal layer)
25 liquid crystal layer (display medium layer)
26 sealing material
27 terminal
28 wire electrode
30 oxide semiconductor film
31 oxide semiconductor film (second oxide semiconductor film)
35 spacer
40 liquid crystal display panel
50 liquid crystal display panel

The invention claimed is:

1. A display panel, comprising:
a first substrate which includes a flexible first plastic substrate and a terminal region on the first plastic substrate where a terminal and a wire electrode are formed;
a second substrate which faces the first substrate and includes a flexible second plastic substrate; and
a display medium layer provided between the first substrate and the second substrate, wherein
the display panel includes a metal layer provided on a surface of the second plastic substrate which faces the terminal region to reflect laser light, and a protection film sandwiched between the first substrate and the second substrate to cover the metal layer, and
the protection film includes a laser light absorbing film which covers the metal layer, and a resin film provided on the wire electrode and layered on the laser light absorbing film.

2. The display panel of claim 1, wherein
the metal layer is made of a material selected from the group consisting of titanium (Ti), aluminum (Al), chromium (Cr), nickel (Ni), silver (Ag), molybdenum (Mo), an aluminum oxide ($Al_2O_3$), an aluminum alloy, and a silver alloy.

3. The display panel of claim 1, wherein
a thickness of the metal layer is 100 nm or more.

4. The display panel of claim 1, wherein
the protection film is made of a material selected from the group consisting of a silicon nitride, a silicon oxide, a silicon oxynitride, a silicon nitride oxide, an epoxy resin, and an acrylic resin.

5. The display panel of claim 1, wherein
the laser light absorbing film is made of a resin material in which at least a material selected from the group consisting of a metal material, a light-absorbing pigment, and a light-absorbing dye is dispersed.

6. The display panel of claim 1, wherein
the resin film is made of an epoxy resin or an acrylic resin.

7. The display panel of claim 1, wherein
a second metal layer which reflects laser light is provided on a surface of the laser light absorbing film which faces the first substrate, and
a second laser light absorbing film which covers the second metal layer is provided between the laser light absorbing film and the resin film.

8. The display panel of claim 7, wherein
the second metal layer is made of a material selected from the group consisting of titanium (Ti), aluminum (Al), chromium (Cr), nickel (Ni), silver (Ag), molybdenum (Mo), an aluminum oxide ($Al_2O_3$), an aluminum alloy, and a silver alloy.

9. The display panel of claim 7, wherein
a thickness of the second metal layer is 100 nm or more.

10. The display panel of claim 7, wherein
the second laser light absorbing film is made of a resin material in which at least a material selected from the group consisting of a metal material, a light-absorbing pigment, and a light-absorbing dye is dispersed.

11. The display panel of claim 1, wherein
the display medium layer is a liquid crystal layer.

12. A display panel, comprising:
a first substrate which includes a flexible first plastic substrate and a terminal region on the first plastic substrate where a terminal and a wire electrode are formed;
a second substrate which faces the first substrate and includes a flexible second plastic substrate; and
a display medium layer provided between the first substrate and the second substrate, wherein
the display panel includes an oxide semiconductor film provided on a surface of the second plastic substrate which faces the terminal region to reflect laser light, and a protection film sandwiched between the first substrate and the second substrate to cover the oxide semiconductor film, and
the protection film includes a laser light absorbing film which covers the oxide semiconductor film, and a resin film provided on the wire electrode and layered on the laser light absorbing film.

13. The display panel of claim 12, wherein
a second oxide semiconductor film which reflects laser light is provided on a surface of the laser light absorbing film which faces the first substrate, and
a second laser light absorbing film which covers the second oxide semiconductor film is provided between the laser light absorbing film and the resin film.

* * * * *